No. 897,226. PATENTED AUG. 25, 1908.
E. B. RAYMOND.
MEANS FOR GENERATING AND DISTRIBUTING ALTERNATING CURRENTS.
APPLICATION FILED NOV. 30, 1903.
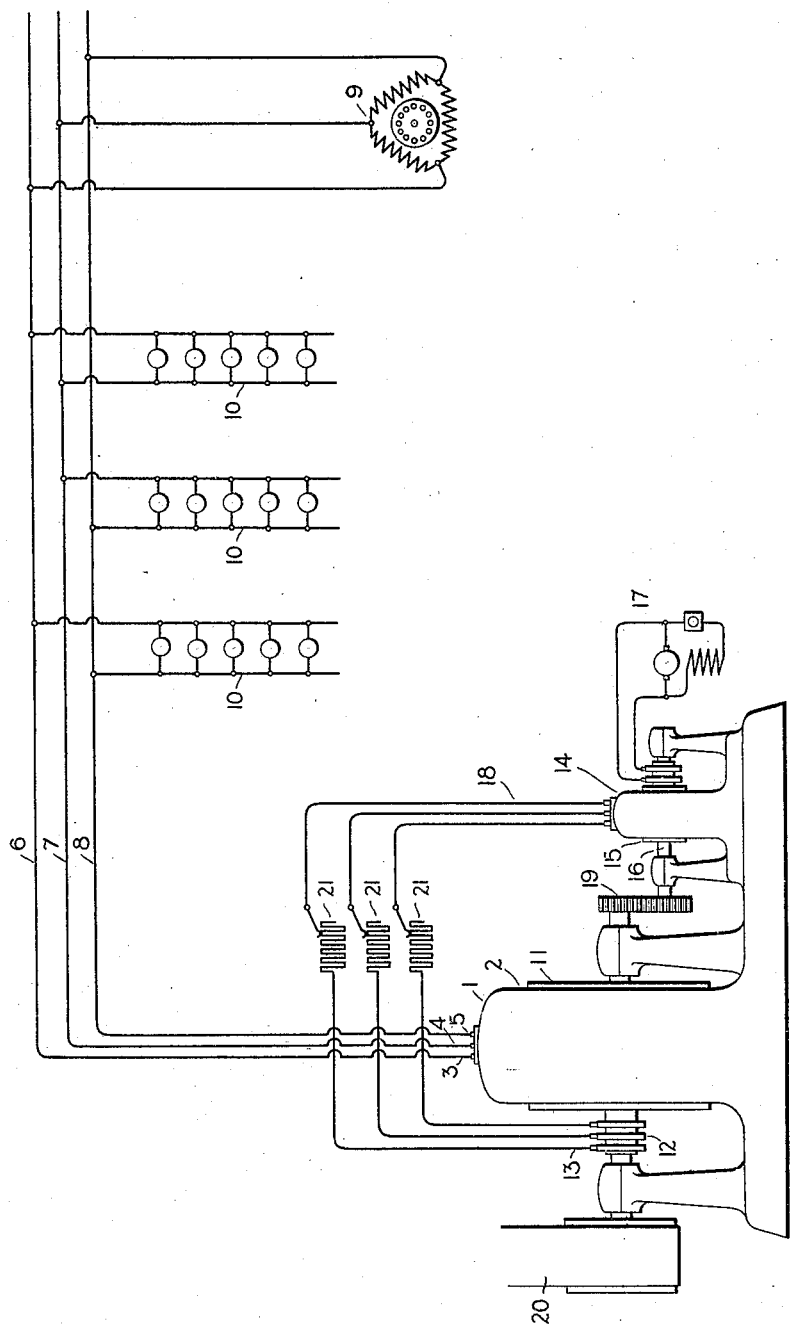
Witnesses.
Harry N. Tilden.
Helen Orford
Inventor.
Edward B. Raymond.
by Albert G. Davis
Att'y.

UNITED STATES PATENT OFFICE.

EDWARD B. RAYMOND, OF SCHENECTADY, NEW YORK, ASSIGNOR TO GENERAL ELECTRIC COMPANY, A CORPORATION OF NEW YORK.

MEANS FOR GENERATING AND DISTRIBUTING ALTERNATING CURRENTS.

No. 897,226.     Specification of Letters Patent.     Patented Aug. 25, 1908.

Original application filed December 22, 1902, Serial No. 136,201. Divided and this application filed November 30, 1903. Serial No. 183,193.

*To all whom it may concern:*

Be it known that I, EDWARD B. RAYMOND, a citizen of the United States, residing at Schenectady, county of Schenectady, State of New York, have invented certain new and useful Improvements in Means for Generating and Distributing Alternating Currents, (division of my application Serial No. 136,201, filed December 22, 1902,) of which the following is a specification.

My invention relates to the generation and distribution of alternating currents of any given number of phases, and comprises certain improvements whereby the source of current is so regulated that its voltage remains substantially constant with change either in load or in power factor of the current supplied thereby. In alternating current generators as now in common use, the lag or lead of the alternating currents supplied affects the voltage, causing it to increase when the machine delivers leading current and to decrease when it delivers lagging current. By the use of my invention, this disadvantage is practically obviated.

In carrying out my invention in practice I make use of an alternating current generating machine each of the relatively rotating members of which is provided with a winding adapted to be traversed by alternating currents. One of the members I connect to an alternating current machine of low frequency for supplying the exciting current. By mechanical power I produce relative rotation between the two members of the generator, thereby producing relative motion between one of the members and the rotating magnetic field developed in the other member by reason of its connection to the exciter, thus developing in the first member of the generator alternating currents of a frequency depending upon the speed of relative rotation of the members of the generator and upon the direction which this rotation takes relatively to the direction of rotation of the magnetic field produced by the exciter. If the direction of mechanical rotation of the rotating member of the generator is such that the frequency of the generated current represents the frequency of the exciter currents added to the frequency corresponding to mechanical rotation, there results a mode of operation in which the difficulties heretofore experienced in generating alternating currents are greatly aggravated instead of improved. I have found however that if the relative rotation is such that the generated current represents the difference between the frequency corresponding to mechanical rotation and that of the exciting current, or in other words is such that the machine is driven above synchronism corresponding to the frequency of the exciter currents, instead of the reverse, then a condition of current generation is produced in which the voltage of the generated currents may remain substantially constant regardless of variations in the magnitude or in the power factor of the generated currents.

The features of novelty which I believe characterize my invention I have set forth with particularity in the appended claims, while in the following description which is to be taken in connection with the accompanying drawings I have referred more in detail to the construction and mode of operation of my invention.

In the drawings the main generator is indicated at 1 and consists of two members in close mutual inductive relation to each other and having the structure of an ordinary induction motor with definite armature winding. Each member is provided with an alternating current winding of any given number of phases either single phase or multiphase but preferably multiphase. In the present instance the fixed member or stator 2 is provided with a three phase winding similar to the inducing winding of an ordinary three phase alternating current induction motor. The terminals of this winding are indicated at 3, 4 and 5, and therefrom extend distribution mains 6, 7 and 8 supplying current to translating devices of any desired character such for example as an induction motor indicated at 9, banks of lamps 10, or the like. Instead of feeding current directly to this distribution system it is of course obvious that step-up or step-down transformers may be employed without departing from my invention. The other member or rotor 11 of the generator is provided with an alternating current winding, in this case a three phase winding, with which collector rings 12 and brushes 13 are operatively related for the purpose of connecting the winding to an alternating current exciter 14 preferably of low frequency and in any case of a lower frequency than the current impressed upon the mains 6, 7 and 8 by the generator 1.

The exciter 14 is an ordinary alternating current machine having a direct current field magnet member and an alternating current member operatively related thereto. In the present case the direct current member is the rotating member and consists of a suitable number of field magnets such as 15 mounted upon a shaft 16 and excited by current from some direct current source such for example as a small direct current exciter indicated conventionally at 17.

The alternating current winding of the exciting machine 14 is of the three phase type to correspond with the three phase winding of the rotor 11 of the main generator and is connected therewith through a set of leads 18, but it is to be understood that windings of other number of phases may be employed without departing from my invention.

The rotary member of the exciter is driven at some definite speed relatively to the speed of rotation of the main generator, and for this purpose it may either be geared thereto through belting or spur gears or may be mounted upon the same shaft as the main generator 1 or upon a continuation thereof. The spur-gear connection between the two rotary members of the machines 1 and 4 is chosen for purposes of illustration and is indicated at 19.

In operating the mechanism above described, power may be supplied by means of a belt 20 to a suitable pulley on the shaft of the main machine, or in place thereof any other suitable mechanical driving means may be used, the mechanical power being derived from any source such for example as a steam engine, water wheel, electric motor or the like.

The generator 1 when operated in accordance with my invention resembles an induction generator in which, as is well understood to those skilled in the art, one of the members is supplied with an alternating current of a certain frequency, and mechanical rotation between the two members is produced so as to operate the machine at a speed in excess of synchronism. Such a machine when operating as an induction generator absorbs mechanical power which is transformed into electrical power in the circuits supplying the exciting currents. According to my invention however I supply the current-consuming translating devices with current not from the low frequency circuit of the machine, but from the other member which develops what may be called a compound or differential frequency.

Turning now to the drawings let it be supposed that the machine 14, which for convenience I have termed an exciter since under some circumstances it may act as a generator and under other circumstances as a motor, generates current of low frequency, say for example six cycles, and that this current is supplied over the leads 18 to the rotor 11 of the generator 1. This current will produce a magnetic field in the member 11 rotating in one direction or the other depending upon the relative connection of circuits. Suppose for example that this direction be like that of the hands of a watch. If the rotor 11 be at rest then the members of the generator 1 will correspond to the primary and secondary of an ordinary transformer, and current of a frequency six will be developed in the other member 2 of the generator and supplied thereby to the distribution system. Under these conditions all of the power is supplied from the exciter 14. Suppose now the rotor 11 be set into motion so that it takes the opposite direction of rotation from that of the rotary magnetic field produced therein by current from the exciter. As the speed of the rotor slowly rises the rotation of the magnetic field in space becomes slower and slower until at a certain point it becomes fixed in space. Under these circumstances, obviously, there will be no cutting of lines of force by the conductors of the stationary member 2 of the generator and therefore no current will be supplied to the distribution system. The flow of energy from the exciter 14 to the generator 1 has therefore become smaller and smaller until it has ceased altogether. As the rotor 11 is increased in speed the flow of power between the exciter and the generator, instead of being from the exciter to the generator, reverses, the mechanical power supplied to the generator being converted into electrical energy which flows from the generator not only to the distribution mains 6, 7 and 8 but also from the generator to the exciter 14. This exciter therefore changes in function from a generator to a motor. It supplies the magnetizing current for the generator and is a necessary factor in fixing the frequency of the generated current. If its circuit were to be interrupted the main generator would immediately cease to generate current.

The characteristics of this machine are such that the effect of an increase in current in the distribution circuits constituted by the lines 6, 7 and 8 is to cause an increase in current flowing from the rotor 11 of the generator 1 through the leads 18 to the exciter 14. With this increase of current there is evidently an increase in the electro-motive force drop in the leads 18, and since the electro-motive force of the exciter 14 is maintained constant, it evidently follows that the electro-motive forces at the terminals of the rotor winding of the generator rise with increase in load. Inasmuch as the electro-motive forces between the terminals of the rotor winding rise and fall with the electromotive forces between the terminals 3, 4 and 5 of the stator winding of the generator, similar to the corresponding rise and fall of primary and secondary electro-motive forces of an ordinary alternating current transformer, it will be seen that under the circumstances indicated an increase in load on the generator is accompanied by an increase in generated electro-motive force. The amount of this rise in electro-motive force or compounding may be adjusted so that the generator electro-motive force rises with increase in load or is maintained constant as may be desired. Inasmuch as the drop in electro-motive force in the leads 18 connected to the exciter affects the electro-motive force at the terminals of the rotor of the generator from which these leads extend, I may adjust the voltage or compounding of the system by means of adjustable resistances 21 in series with the respective leads.

In order to raise or lower the voltage of the system above described, it is only necessary to correspondingly raise or lower the voltage of the exciter 14, in which case the voltages in the alternating current circuits of the exciter and in the distribution circuits 6, 7 and 8 of the generator rise or fall together in correspondence therewith.

It is to be noted that if the generator 1, instead of being driven above synchronism as regards the rotary field produced in one of its members by its alternating current exciter, were to be driven in the opposite direction, the flow of power between the generator and its exciter, instead of being from the generator to the exciter, would on the contrary be from the exciter to the generator. In this case it will be evident that an increase in load on the main generator would be accompanied by an increase in the current flowing from the exciter to the generator. The drop in potential between the exciter and the generator would be from the exciter to the generator instead of the reverse. Since the exciter voltage is maintained constant it of course follows that the voltage in both sets of windings of the generator would fall instead of rising or remaining constant with increase of load.

What I claim as new and desire to secure by Letters Patent of the United States, is:—

1. The combination of an alternating current generator having two relatively movable members each provided with a multiphase winding, a consumption circuit supplied with current from one of said windings, an alternating current exciter connected to the other winding, and a resistance in the circuit of the exciter between the exciter and the generator for varying the compounding action of the generator.

2. The combination of an alternating current generator having two relatively rotatable members each of which is provided with an alternating current winding, a consumption circuit supplied with current from one of said windings, an alternating current exciter of low-frequency connected to the other winding, and an electro motive force-consuming device in circuit with said exciter.

3. The combination of an alternating current generator having two relatively rotatable members each provided with an alternating current winding, a consumption circuit connected to one of said windings, a low-frequency exciter connected to the other winding, an electro-motive-force-consuming device in circuit with said exciter and means for driving said machine by mechanical power in a direction above synchronism and at a speed greatly in excess thereof whereby the machine is capable of supplying alternating currents to said consumption circuit at a voltage which may be either substantially constant with varying load or power factor or may rise with increasing load as desired.

In witness whereof, I have hereunto set my hand this 28th day of November, 1903.

EDWARD B. RAYMOND.

Witnesses:
 BENJAMIN B. HULL,
 HELEN ORFORD.